(12) United States Patent
Kaupert et al.

(10) Patent No.: US 8,647,788 B2
(45) Date of Patent: Feb. 11, 2014

(54) FUEL CELL MODULE

(75) Inventors: Andreas Kaupert, Esslingen (DE); Markus Münzner, Ebersbach (DE); Klaus Luz, Herrenberg (DE); Martin Brenner, Kieselbronn (DE)

(73) Assignees: Eberspächer Climate Control Systems GmbH & Co KG, Esslingen (DE); Behr GmbH & Co KG, Stuttgart (DE)

( * ) Notice: Subject to any disclaimer, the term of this patent is extended or adjusted under 35 U.S.C. 154(b) by 434 days.

(21) Appl. No.: 12/702,562

(22) Filed: Feb. 9, 2010

(65) Prior Publication Data
US 2010/0266924 A1  Oct. 21, 2010

(30) Foreign Application Priority Data

Apr. 16, 2009 (DE) .......................... 10 2009 017 597

(51) Int. Cl.
*H01M 8/24* (2006.01)

(52) U.S. Cl.
USPC .......................................................... 429/452

(58) Field of Classification Search
None
See application file for complete search history.

(56) References Cited

U.S. PATENT DOCUMENTS

| 7,008,715 B2 * | 3/2006 | Richardson et al. ........... 429/433 |
| 2005/0136305 A1 * | 6/2005 | Eberspach et al. ............. 429/26 |
| 2007/0269693 A1 * | 11/2007 | Perry .............................. 429/24 |

* cited by examiner

*Primary Examiner* — Ula C Ruddock
*Assistant Examiner* — Daniel Gatewood
(74) *Attorney, Agent, or Firm* — McGlew and Tuttle, P.C.

(57) ABSTRACT

A fuel cell module (1) with a fuel cell (2), a residual gas burner (4) and a heat exchanger (6). The service life of the module (1) can be improved by at least one compensator (27) for establishing a flow-carrying connection between the residual gas burner (4) and the heat exchanger (6).

11 Claims, 2 Drawing Sheets

FUEL CELL MODULE

CROSS REFERENCE TO RELATED APPLICATIONS

This application claims the benefit of priority under 35 U.S.C. §119 of German Patent Application DE 10 2009 017 597.0 filed Apr. 16, 2009, the entire contents of which are incorporated herein by reference.

FIELD OF THE INVENTION

The present invention pertains to a fuel cell module.

BACKGROUND OF THE INVENTION

Such a fuel cell module may have a fuel cell, a residual gas burner and a heat exchanger. The fuel cell is used in the conventional manner to generate electric current from an anode gas containing hydrogen and from a cathode gas containing oxygen. Hydrogen-containing anode waste gas of the fuel cell and oxygen-containing cathode waste gas of the fuel cell can be burned or reacted in the residual gas burner to reduce pollutant emissions and to convert chemically bound energy into heat. For example, heat can be extracted from the burner waste gas formed by the combustion reaction in the residual gas burner with the heat exchanger and transferred to another educt. It may be an internal educt, e.g., the cathode gas fed to the fuel cell, or an external educt, e.g., a heat exchanger medium of a heating circuit or cooling circuit of a motor vehicle, in which a fuel cell system operating with the fuel cell module is arranged.

Such a fuel cell module is characterized by an extremely compact design, as a result of which it is especially suitable for use in motor vehicles, because it requires comparatively little space for installation. Thermal expansion effects may be problematic in such a compact design. The individual components of the fuel cell module pass over a very broad temperature range especially during the running up of the power and switching off of a fuel cell system. It is especially critical in such situations that different components of the fuel cell module are heated up and cooled down at different rates. For example, the temperature of the heat exchanger may rise considerably faster than that of the fuel cell. The connections between the individual components within the fuel cell module are exposed to high stresses because of these thermal effects. The service life of the fuel cell module may be reduced hereby.

SUMMARY OF THE INVENTION

The present invention pertains an improved embodiment for a fuel cell module, which embodiment is characterized especially by longer service life.

According to the invention, a fuel cell module is provided comprising a fuel cell component, a residual gas burner component, a heat exchanger component and a compensator. The compensator provides a flow-carrying connection between two components of the module.

The present invention is based on the general idea of connecting at least two components of the fuel cell module to one another via a compensator in a flow-carrying manner. This means that the respective compensator forms a flow-carrying or educt-carrying connection between the two components. Such a compensator is characterized in that in its longitudinal direction it has an extremely high flexural elasticity, which can reversibly compensate expansions and bending deformations in a comparatively broad range. In other words, the respective compensator permits relative motions between the components that are in connection via the compensator without unacceptably great stresses developing in the connection sites. The thermal stress of the fuel cell module is correspondingly reduced considerably, which leads to a prolongation of service life.

It is especially advantageous, on the one hand, to provide such a compensator between the residual gas burner and the heat exchanger and, on the other hand, to provide another compensator between the heat exchanger and the fuel cell or between a deflecting housing of the heat exchanger and a distributor housing of the fuel cell, on the other hand. In particular, it is possible by the use of two such compensators to allow complex, three-dimensional relative motions between the individual components of the fuel cell module. For example, the thermal expansion between the residual gas burner and the heat exchanger is markedly greater or it occurs earlier or later in time than that between the fuel cell and the heat exchanger. As a consequence, a tilting motion of the heat exchanger relative to the fuel cell occurs in case of compensators aligned in parallel. Such a tilting motion can be readily compensated by the compensators without the individual connection sites being unduly stressed in the process.

Further important features and advantages of the present invention appear from the subclaims, from the drawings and from the corresponding description of the figures based on the drawings.

It is obvious that the features, which were mentioned above and will also be explained below, can be used not only in the particular combination indicated, but in other combinations or alone as well without going beyond the scope of the present invention.

Preferred embodiments of the present invention are shown in the drawings and will be explained in more detail in the following description, where identical reference numbers designate identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
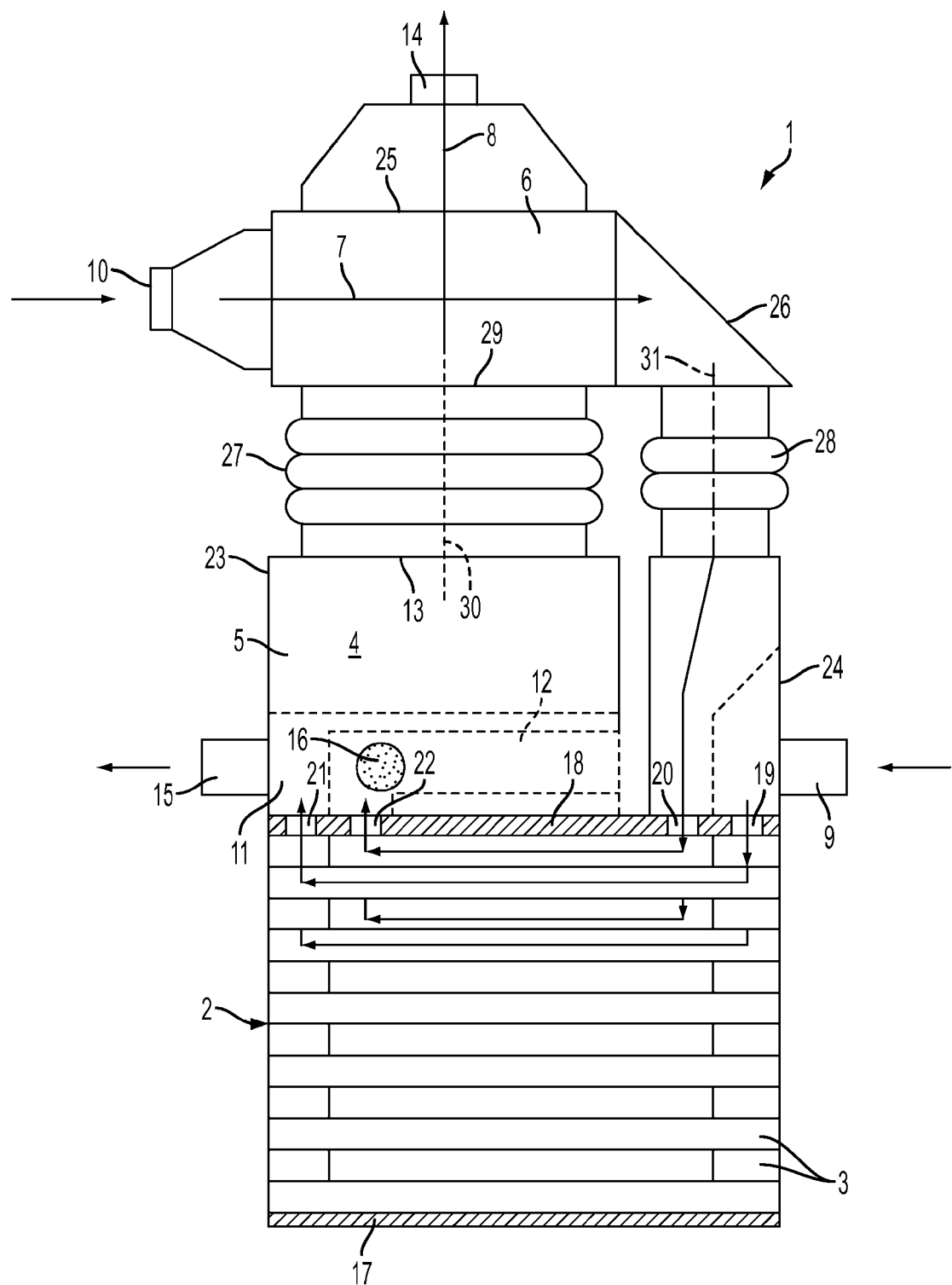
FIG. 1 is a schematic view showing a fuel cell module.

Referring to the drawings in particular, corresponding to FIG. 1, a fuel cell module 1 comprises a fuel cell 2, which is preferably a Solid Oxide Fuel Cell (SOFC). The fuel cell 2 may be composed, e.g., of a plurality of fuel cell elements 3 stacked up on one another. Module 1 has, in addition, a residual gas burner 4, which contains a combustion chamber 5. Furthermore, a heat exchanger 6 is provided, which is integrated in a cathode gas path or air path 7, on the one hand, and in a burner waste gas path 8, on the other hand, in order to couple these paths 7, 8 in a heat-transmitting manner. Paths 7, 8 are coupled with one another in cross current in the example.

Module 1 has an anode gas inlet 9, via which anode gas or combustion gas or synthesis gas can be fed. The anode gas originates, for example, from a reformer, which generates a hydrogen-containing combustion gas, namely, the anode gas, e.g., from hydrocarbon-containing fuel and air, e.g., by means of catalytic reforming or by means of steam reforming. As an alternative, the anode gas may also be provided from a hydrogen (gas) tank. The anode gas is fed to the fuel cell 2 and enters an anode space or anode gas path there.

Module 1 also has a cathode gas inlet 10, via which cathode gas, especially air, can be fed. The cathode gas inlet 10 is formed, e.g., at the heat exchanger 6 here. The cathode gas path 7 leads from the cathode gas inlet 10 through the heat exchanger 6 and to the fuel cell 2 and enters a cathode space or cathode gas path there.

Separation is brought about within the fuel cell 2 or within the individual fuel cell elements 3 by means of an electrolyte, not shown in more detail here, between the anode space and the cathode space and between the anode gas path and the cathode gas path. The hydrogen of the anode gas and the oxygen of the cathode gas are "converted into electric energy" at this electrolyte.

Anode waste gas and cathode waste gas are fed via separate paths to the residual gas burner 4 on the inlet side. The residual gas burner 4 may have an anode waste gas inlet space 11 and a cathode waste gas inlet space 12 for this. The waste gases of the fuel cell 2 enter the combustion chamber 5 of the residual gas burner 4 from these spaces 11, 12. The fuel cell waste gases are converted by a combustion reaction, which may be initiated by means of a corresponding igniting means, not shown here, while burner waste gas is generated. This leaves the combustion chamber 5 through a waste gas outlet 13. The waste gas path 8 leads from the waste gas outlet 13 through the heat exchanger 6 to a waste gas outlet 14 of module 1.

Moreover, in the preferred example being shown here, module 1 has a recyclate outlet 15. This recyclate outlet 15 communicates, e.g., with the anode waste gas space 11 and makes it possible to return the anode waste gas, e.g., to the aforementioned reformer. Furthermore, a cooling gas port 16, which communicates with the cathode waste gas space 12, is optionally present in the example being shown. A suitable cooling gas can be fed via this cooling gas port 16 to the residual gas burner 4 to prevent overheating of the residual gas burner 4. Air, which is preferably not preheated but is taken as "cold air" from the environment, is especially suitable for use as cooling gas.

The stack of fuel cell elements 3, which forms the fuel cell 2, has on its front sides so-called "end plates" 17, 18, namely, a lower end plate 17 shown at the bottom in FIG. 1 and an upper end plate 18 shown at the top in FIG. 1. All educt ports of the fuel cell 2 are formed on the upper end plate 18 in the example. As can be recognized, an anode gas inlet 19, a cathode gas inlet 20, an anode gas outlet 21 and a cathode gas outlet 22 are provided as educt ports. The residual gas burner 4 is attached with its housing 23 directly to this upper end plate 18 and is connected to the anode gas outlet 21 and to the cathode gas outlet 22. In particular, the upper end plate 18 may be structurally integrated in the residual gas burner 4. In addition, a distributor housing 24, which is attached to the upper end plate 18 and which is connected to the anode gas inlet 19 and to the cathode gas inlet 20 of the upper end plate 18, is provided in the embodiment being shown here. Furthermore, the anode gas inlet 9 is formed in the example on this distributor housing 24. In addition, the heated cathode gas is fed to the distributor housing 24.

Due to the thermal stresses which occur during the operation of the fuel cell module 1, the fuel cell elements 3 are made—aside from the electrolyte—of a ferritic steel. The fuel cell 2 correspondingly consists largely of ferritic material. The end plates 17, 18 are preferably ferritic as well. Housing 23 of the residual gas burner 4 is preferably also made of a ferritic steel. In addition, the distributor housing 24 may also be manufactured from a ferritic steel. Contrary to this, an austenitic steel is used to manufacture the heat exchanger 6. A housing 25 of the heat exchanger 6, especially including a deflecting housing 26, correspondingly consists of an austenitic material. Since ferrite and austenite have greatly different coefficients of thermal expansion, comparatively great thermal expansion effects may occur during the operation of the fuel cell module 1, which covers an extremely broad temperature range. As an alternative to ferrite and/or austenite, a nickel-based alloy, e.g., INCONEL®, may be used as well.

To avoid or reduce stresses in the microstructure due to different thermal expansions, especially when a fuel cell system equipped with the fuel cell module 1 is switched on or its power is run up as well as when it is switched off or its power is reduced, it is proposed according to the present invention that a respective compensator 27 and 28 (each) be arranged between two components of the fuel cell module 1, which have especially different coefficients of thermal expansion. Two such compensators 27, 28 are provided in the example being shown. The respective compensator 27, 28 is designed such that it can compensate expansion effects caused by heat between the components connected to one another via the respective compensator 27, 28. A so-called "corrugated bellows," which is characterized in that it has a flexible tube-like or tubular design and has a corrugated jacket profile in its longitudinal section, is especially suitable for use as a compensator 27, 28. Compensator 27, 28 can compensate extremely great expansions in the axial direction as a result.

One or the first compensator 27 has a central longitudinal axis 30 and the other or second compensator 28 has a central longitudinal axis 31. The two compensators 27, 28 are arranged in the preferred example shown such that they act in parallel. This means in the example that they are mounted with their central longitudinal axes 30, 31 directed in parallel to one another.

At least the residual gas burner 4 or the housing 23 thereof and the heat exchanger 6 or the housing 25 thereof are connected to one another via such a compensator 27 in the example. This means that the burner waste gas outlet 13 of the residual gas burner 4 is connected to a waste was inlet 29 of the heat exchanger 6. In addition, the distributor housing 24 is optionally connected in the example to the heat exchanger 6 or to the deflecting housing 26 thereof by means of such a compensator 28.

Additional compensators are conceivable at the individual inlets 9, 10, 16 and outlets 14, 15.

The compensators 27, 28 shown are characterized by high elasticity or reversible expansibility in their axial direction, on the one hand, and are characterized, on the other hand, by high flexibility in respect to reversible bending deformations. Bending stresses may occur above all when a fuel cell system equipped with the fuel cell module 1 is started up, because the heat exchanger 6, deflecting housing 26, distributor housing 24 and residual gas burner 4 are heated up more rapidly during the heating-up operation than the fuel cell 2. This causes the two compensators 27, 28 to be exposed to different tensile stresses, so that a torque may, in principle, develop. This can be compensated by the described flexural elasticity of the compensators 27, 28.

The respective compensator 27, 28 may be designed as a single-layer or single-walled or multilayer or multiwalled corrugated bellows. It may be manufactured from austenite or ferrite. It may be manufactured preferably from an especially corrosion-resistant and/or high-temperature-resistant nickel-based alloy. Such alloys are available, for example, under the trade name INCONEL®. It is likewise possible to manufacture the corrugated bellows from an alloy whose coefficient of thermal expansion is between the coefficients of thermal expansion of austenite and ferrite, namely, preferably in the relevant temperature window that may range from −40° C. to +1,000° C. The coefficient of thermal expansion of the material used for the respective compensator 27, 28 is preferably in the middle, i.e., at 50%±20% between the coefficients of thermal expansion of the components connected to one another via the respective compensator 27, 28, i.e., especially of austenite and ferrite. A duplex material, which has both an austenite phase and a ferrite phase, may be preferably used here.

Figure 2:
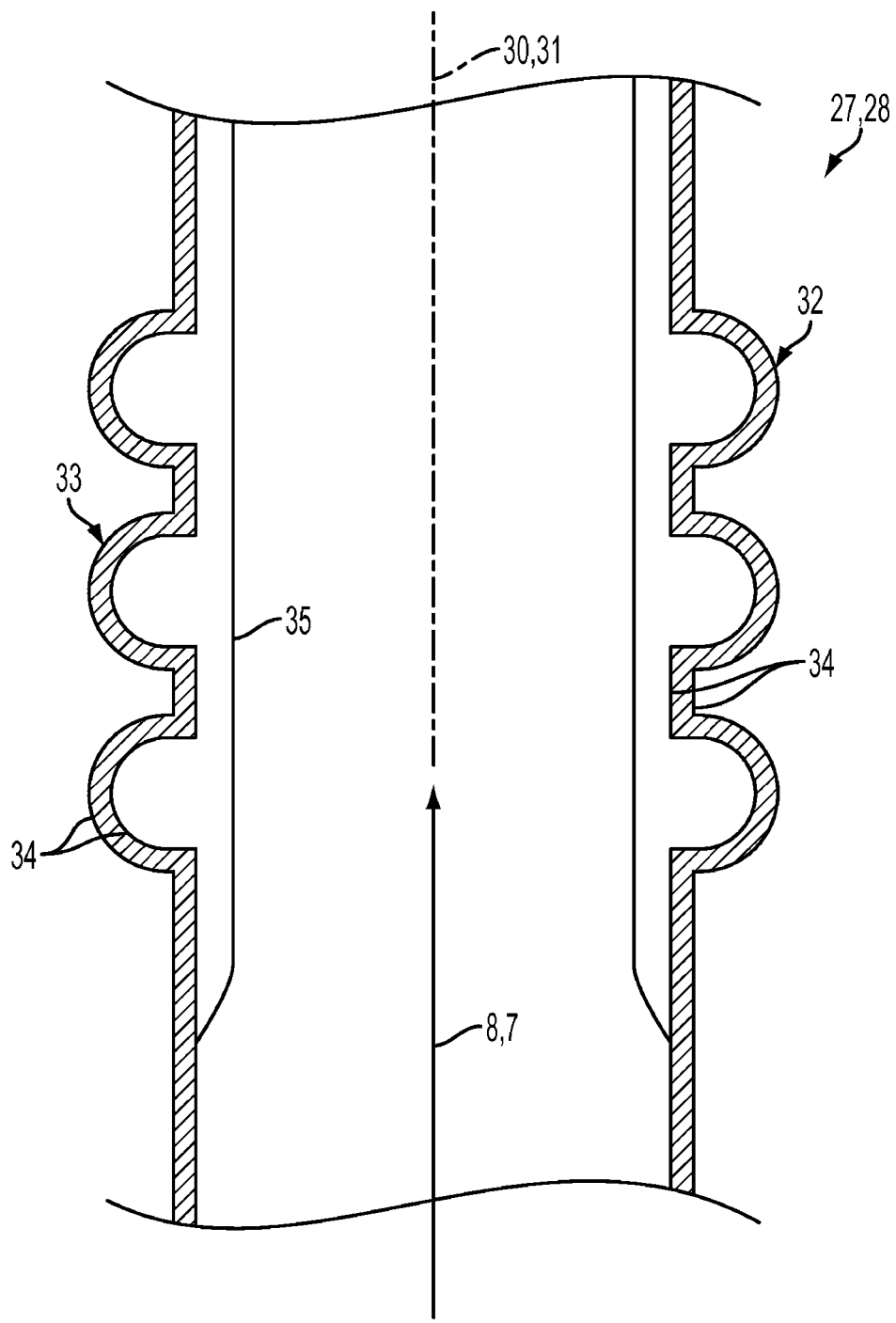
FIG. 2 is a schematic longitudinal sectional view through a compensator.

FIG. 2 shows as an example a compensator 27, 28 in the longitudinal section. As can be recognized, it has a corrugated structure 32 in the example, which may, in addition, be provided with a double wall 33. The double wall 33 has two walls 34, which are preferably manufactured from thin and hence elastic sheet metals.

Corresponding to FIG. 2, at least one protective plate 35 may, in addition, be located inside the compensators 27, 28, in order to reduce or prevent the direct contact between the burner waste gas or cathode air and the plates of the corrugated structure 32, which may be thin. The respective protective plate 35 is fixed to the respective compensator 27, 28 at its incoming flow side end only, namely, upstream of the respective corrugated structure 32.

The ferrite material is characterized in that it can be connected better with the usually ceramic electrolyte, e.g., in an SOFC fuel cell 2. Contrary to this, the austenite material is characterized by higher temperature stability.

While specific embodiments of the invention have been described in detail to illustrate the application of the principles of the invention, it will be understood that the invention may be embodied otherwise without departing from such principles.

What is claimed is:

1. A fuel cell module comprising:
   a fuel cell component;
   a residual gas burner component;
   a heat exchanger component; and
   a compensator providing a flow-carrying connection between two components of the module, said compensator reversibly compensating expansions and bending deformations between said two components of the module, said compensator comprising a corrugated bellows and a protective plate type member arranged inside said corrugated bellows, said protective plate type member being fixed to said compensation member on an incoming flow side end only.

2. A fuel cell module in accordance with claim 1, wherein said compensator is arranged between said residual gas burner and said heat exchanger.

3. A fuel cell module in accordance with claim 1, wherein said compensator is arranged between said heat exchanger and said fuel cell.

4. A fuel cell module in accordance with claim 1, wherein:
   said heat exchanger has a deflecting housing;
   said fuel cell has a distributor housing; and
   said compensator is arranged between said deflecting housing of said heat exchanger and said distributor housing of said fuel cell.

5. A fuel cell module in accordance with claim 1, wherein said components connected to one another via said compensator have different coefficients of thermal expansion.

6. A fuel cell module in accordance with claim 1, wherein one of said components connected to one another via said compensator comprises an austenite part or as a nickel-based alloy part made of INCONEL®, while the other component is designed as a ferrite component or as a nickel-based alloy part made of INCONEL®.

7. A fuel cell module in accordance with claim 1, further comprising another compensator providing a flow-carrying connection between two components of the module to provide two compensators acting in parallel and/or arranged in parallel to one another.

8. A fuel cell module in accordance with claim 1, wherein said compensator comprises a corrugated bellows.

9. A fuel cell module in accordance with claim 8, wherein said corrugated bellows is provided with a single-layer or multilayer wall.

10. A fuel cell module in accordance with claim 5, wherein said compensator has a coefficient of thermal expansion that is between said different coefficients of thermal expansion of the two components connected to one another via said compensator.

11. A fuel cell module in accordance with claim 1, wherein:
   one of said components is an austenite part;
   another one of said components is a ferrite component.

* * * * *